(12) United States Patent
Malkowski, Jr. et al.

(10) Patent No.: US 7,511,946 B2
(45) Date of Patent: Mar. 31, 2009

(54) VERTICAL NEUTRAL BUS AND SUPPORT FOR MOTOR CONTROL CENTER

(75) Inventors: Chester Malkowski, Jr., Franklin, WI (US); Ralph E. Meiers, Watertown, WI (US); Dean Thomas Meyer, Oak Creek, WI (US); Arnaldo Hiroyuki Omoto, São Paulo (BR); Herberto Bergmann, São Paulo (BR)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 484 days.

(21) Appl. No.: 11/271,007

(22) Filed: Nov. 11, 2005

(65) Prior Publication Data

US 2007/0109733 A1    May 17, 2007

(51) Int. Cl.
*H02B 1/20* (2006.01)
(52) U.S. Cl. .................................. 361/648; 174/174
(58) Field of Classification Search ................. 361/600, 361/601, 624, 627, 637, 639, 648, 675, 641, 361/358; 174/174
See application file for complete search history.

(56) References Cited

U.S. PATENT DOCUMENTS

| | | | | | |
|---|---|---|---|---|---|
| 3,219,887 | A | * | 11/1965 | Gerg et al. | 361/675 |
| 3,311,793 | A | * | 3/1967 | Kussy et al. | 361/638 |
| 4,121,276 | A | * | 10/1978 | Kovatch et al. | 361/614 |
| 4,180,845 | A | * | 12/1979 | Shariff et al. | 361/624 |
| 4,366,528 | A | * | 12/1982 | Cole | 361/831 |
| 4,472,761 | A | * | 9/1984 | Koslosky et al. | 361/638 |
| 5,295,041 | A | * | 3/1994 | Metivier et al. | 361/622 |
| 5,905,631 | A | * | 5/1999 | Winkler | 361/641 |
| 6,069,321 | A | | 5/2000 | Wagener et al. | |
| 2007/0109731 | A1 | * | 5/2007 | Bergmann et al. | 361/624 |

FOREIGN PATENT DOCUMENTS

EP        1 387 454 A1     2/2004

* cited by examiner

*Primary Examiner*—Hae Moon Hyeon
(74) *Attorney, Agent, or Firm*—Fletcher Yoder; Alexander R. Kuszewski

(57) ABSTRACT

A bus support system is disclosed that accommodates three-wire three-phase circuitry and four-wire three-phase circuitry. A main bus support element is designed to receive horizontal bus bars and vertical bus bars for installation in an electrical enclosure. The main support element is supplemented by an add-on bus support element where a neutral bus is required for four-wire three-phase operation.

19 Claims, 4 Drawing Sheets

VERTICAL NEUTRAL BUS AND SUPPORT FOR MOTOR CONTROL CENTER

BACKGROUND

The present invention relates generally to the field of packaged electrical systems, such as for the distribution of power signals to controlled equipment. More particularly, the invention relates to a bus support system for electrical enclosures that can accommodate busses for four-wire three-phase systems and three-wire three-phase systems.

Electrical enclosures for use with power electronic equipment and switch gear are known and have been used for many years. In industrial applications, for example, such switch gear, as well as semi-conductor power electronic circuits, programmable logic controllers, motor controllers, and so forth, are often housed in large electrical enclosures. The enclosures are often divided into separate compartments or segments in which related equipment and circuits may be disposed. Access to the components may be had through a door, with separate doors typically being provided for separate compartments in large enclosures. Enclosures of this type are currently in use in systems commonly known as motor control centers (MCCs).

Such systems are configured in different ways for different markets, particularly in international markets. For example, in certain markets the systems may accommodate three-wire three-phase power, while in others the systems are designed for four-wire three-phase power. In general, all three-phase power systems carry power over three conductors in sinusoidal waveforms that are offset from one another by 120° of phase difference. Four-wire systems add a fourth neutral conductor to the three power conductors. Such configurations may respond to requirements of local electrical codes, national or regional power grids or systems, customs, and so forth.

Manufacturers of such electrical systems must generally accommodate both three-wire and four-wire three-phase power configurations. The need to provide for power busses for the three power phases, along with a fourth power bus for a neutral conductor can, however, add to either the cost of all systems or to the number of different systems that must be manufactured, assembled and stocked by the system providers. That is, if a universal system is equipped for four-wire three-phase power, additional cost is built into the systems where only three-wire three-phase power is needed by the customer. Conversely, systems built only for three-wire three-phase power are simply unsuitable for use where four-wire three-phase power is required.

There is a need, therefore, for improved electrical system configurations that can accommodate both three-wire three-phase power and four-wire three-phase power. There is a particular need for a system that can be easily and economically configured for different markets based upon a single physical standard.

BRIEF DESCRIPTION

The present invention provides a technique for configuring electrical systems designed to respond to such needs. The system is designed around an electrical bus system that relies upon a main support element for supporting three-phase busses. The support element will typically support vertical three-phase busses on one side thereof. An add-on support element is then configured to interface with the main support element and to support a neutral bus. The support elements, along with the power and neutral busses may be assembled as a subassembly for mounting in an electrical enclosure. Where three-wire three-phase power is required, therefore, only the main support element and three-phase bus bars may be supplied. Where four-wire three-phase power is specified, the add-on support element may be used in conjunction with the main support element and a fourth, neutral bus bar may be added.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
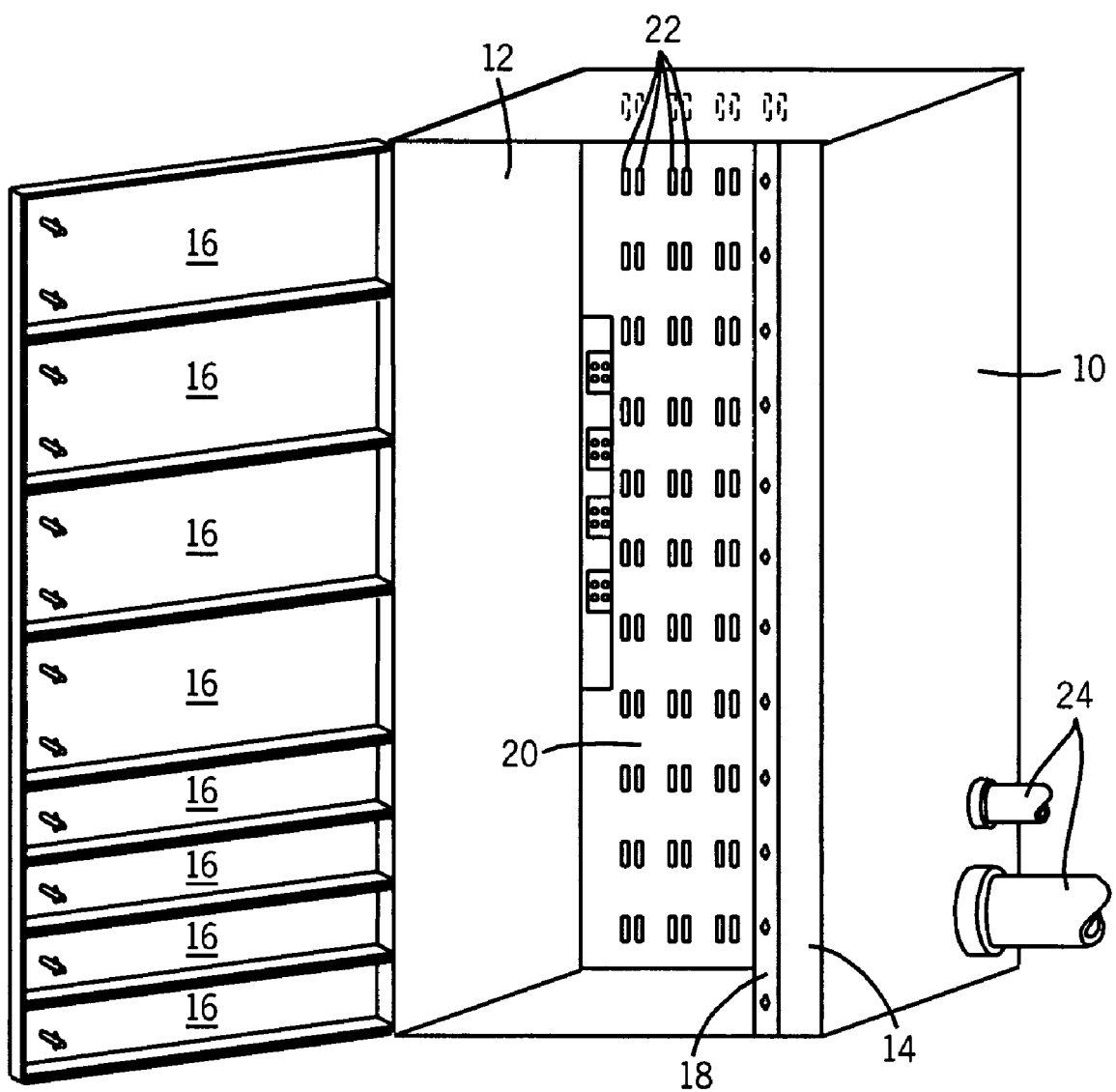
FIG. 1 is a perspective view of an exemplary electrical enclosure incorporating a bus support system in accordance with aspects of the present invention.

Turning now to the drawings, and referring first to FIG. 1, an enclosure 10 is illustrated in which electrical components of various types may be installed. The enclosure may be suitable, for example, for assembly of a motor control center or other industrial, commercial, marine or other electrical system. In general, the enclosure forms a shell around a device mounting volume 12. The shell may be made of any suitable material, such as heavy gage sheet metal, reinforced plastics, and so forth. In the illustrated embodiment, the device mounting volume 12 is flanked by a wireway 14 in which line and load wiring, cabling, and so forth may be installed to service the components within the device mounting volume 12. Individual doors 16 are provided for covering individual compartments of the enclosure that may be subsequently defined by shelves (removed for the sake of clarity) or other structures that support the electrical components. A latch rail 18 is provided adjacent to the device mounting volume to interface with latches on the individual doors.

Along a rear wall of the enclosure 10 is disposed a bus subassembly 20. As described in greater detail below, the bus subassembly permits power to be distributed throughout the enclosure in a plug-in manner. The bus subassembly 20 is generally formed as a backplane having slots 22 for receiving conventional stab-type electrical connections on rear surfaces of device supports received within the enclosure. Such slot and stab arrangements are generally known in the art. In the illustrated embodiment, the slots 22 are divided in pairs to receive corresponding two-pronged stab for each phase of electrical power. Rows of such slots are provided to allow device supports to be mounted at various levels within the enclosure. Electrical power and data signals are provided to the enclosure via appropriate conduits as indicated generally by reference numeral 24 in FIG. 1.

Figure 2:
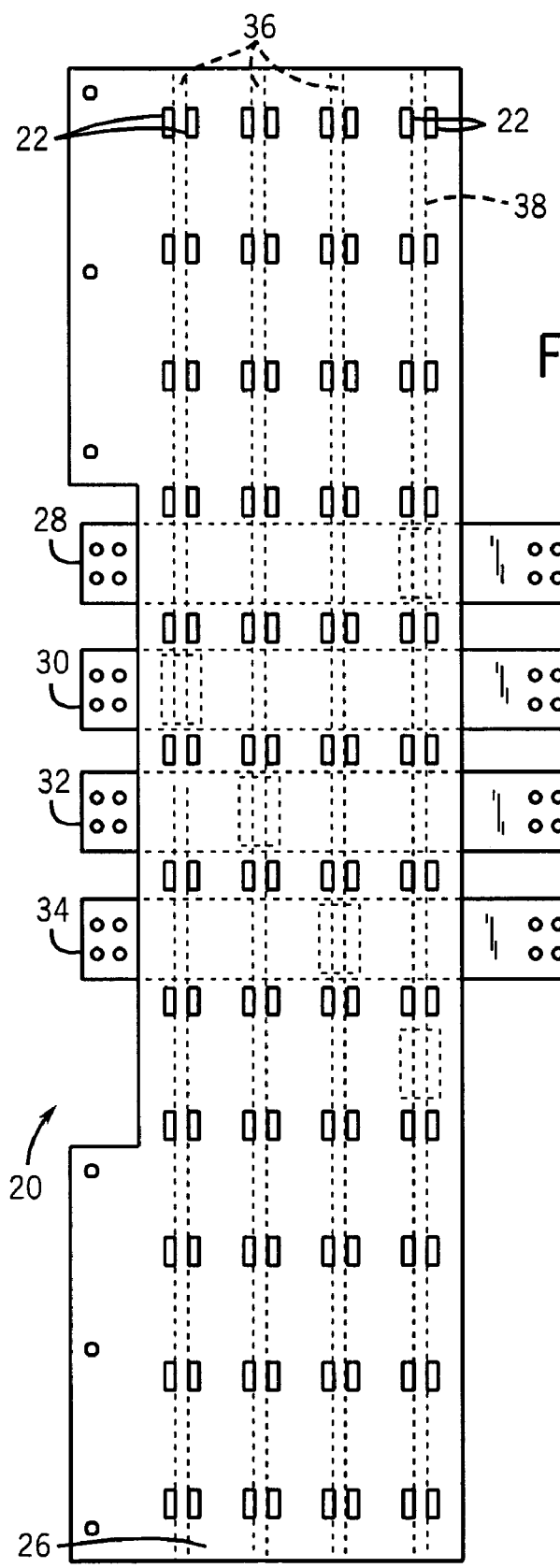
FIG. 2 is an elevational view illustrating an assembled bus support structure with individual busses and a cover for interfacing components with the power busses.

FIG. 2 illustrates the bus subassembly 20 removed from the enclosure of FIG. 1. As shown in the elevational view of FIG. 2, the bus subassembly 20 generally includes a bus cover 26 which is a molded sheet of synthetic material disposed over a series of busses, and a rear bus support described in greater detail below. The bus cover serves to prevent contact with underlying power and neutral busses except through slots 22.

The bus subassembly 20 includes and supports a series of power busses and, where desired, a neutral bus. In the embodiment illustrated in FIG. 2, three-phase busses 28, 30 and 32 are supported by the assembly, in addition to a neutral bus 34. These horizontal busses, when installed in the enclosure, will be coupled to cabling that supplies three-phase power and a neutral connection from an external power supply (e.g., a power supply grid). As mentioned above and described in greater detail below, the arrangement of FIG. 2 is particularly designed for four-wire three-phase power distribution. Where the system is used with only three-wire three-phase power, the neutral horizontal bus 34 is eliminated.

In addition to the horizontal busses, assembly 20 includes a series of vertical phase bus bars 36. Because these bus bars are covered by the bus cover 26, they are shown in dashed lines in FIG. 2. Moreover, a fourth bus bar 38 is provided as a neutral bus bar, owing to the configuration of the subassembly in FIG. 2 as a four-wire three-phase system. The vertical bus bars will typically be made of a bar stock or tubing stock with a flat (described below) that permits them to be mechanically and electrically coupled to corresponding horizontal bus bars in the assembly. Connection of component supports (such as mounted on plates or drawers, not shown) is made by two-pronged stabs that are received through slots 22 and engage the individual bus bars behind the bus cover 26.

Figure 3:
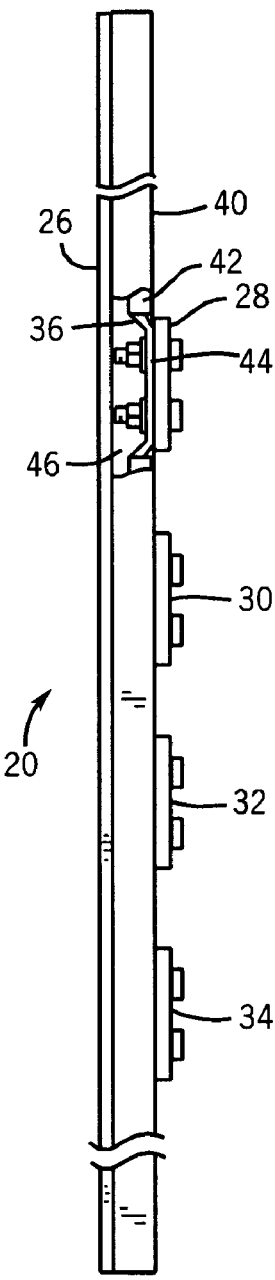
FIG. 3 is a side view of the assembly of FIG. 2.

FIG. 3 is a vertical side view of the assembly of FIG. 2. As shown, the horizontal bus members 28, 30, 32 and 34 are supported by a bus support 40. Bus support 40 serves as a main bus support element in the present arrangement. As described in greater detail below, bus support 40 mechanically supports the various vertical and horizontal bus bars. Within the assembly, and generally between bus support 40 and bus cover 26, each vertical bus bar generally includes a connection portion 42 that is engaged by stabs of component supports, and a bus anchoring portion 44. The bus anchoring portion 44, which is generally a flattened portion of the vertical bus bar, is received through a recess in the bus support 40 (described below) and mechanically and electrically coupled to the corresponding horizontal bus member. An aperture 46 is provided in the bus support for this purpose.

Figure 4:
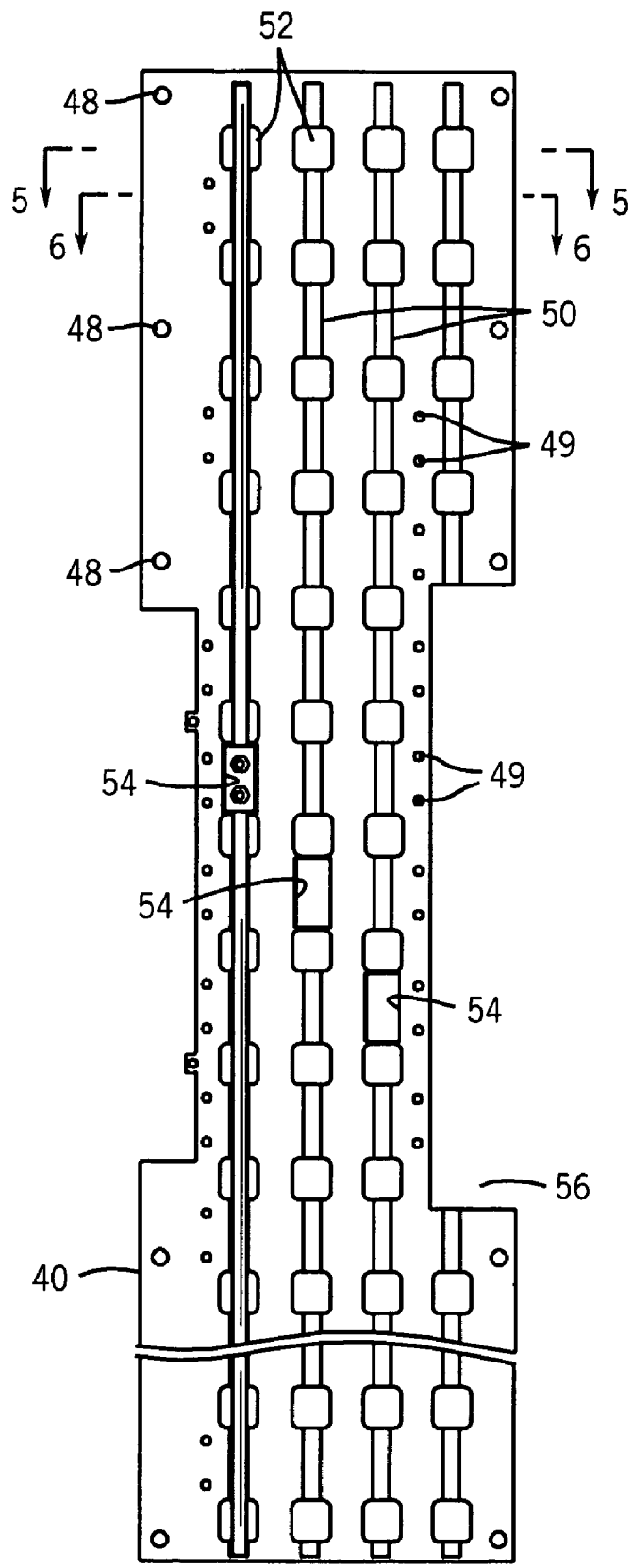
FIG. 4 is an elevational view of a main support element for the assembly shown in FIG. 2, illustrating a single power bus installed and with an add-on support element for a neutral bus removed.

An elevational view of a front side of the bus support 40 is shown in FIG. 4. As noted above, horizontal busses are generally supported on a rear surface of the bus support 40, while vertical bus bars are provided on a front surface thereof. In the embodiment shown in FIG. 4, the main bus support 40 includes a series of apertures or holes for receiving mounting bolts or screws, as indicated at reference numeral 48. These apertures will generally be aligned with corresponding apertures in the rear of the enclosure to support the bus subassembly when mounted therein. Moreover, elongated bus bar support recesses 50 are provided vertically in the bus support. As described below, these elongated bus bar recesses are generally semicircular grooves in which the individual phase and neutral bus bars may lie. Contiguous with, but somewhat deeper than these recesses, are a series of pockets 52. The pockets 52 are designed to receive and accommodate stabs (not shown) of component supports that will protrude through the slots in the bus cover described above. Finally, the main bus support 40 includes a series of apertures 54 that extend completely through the bus support and allow flat bus anchoring portions to protrude therethrough for mechanical and electrical connection to horizontal bus members (not shown in FIG. 4).

The main bus support 40 is, in a present embodiment, formed as a single piece of molded plastic material. The material is preferably one that will not degrade or melt with elevated temperatures that may occur during normal operation. In a present embodiment, the main bus support 40 is made of glass filled polyester, a thermoset plastic. It should be noted that a lateral recess 56 is formed in the molded main bus support 40. Although some of the elongated bus bar recesses and pockets are provided along a right side of the support for a neutral bus bar, when no neutral bus bar is needed (i.e., for three-wire three-phase systems), the recess 56 is open as illustrated in FIG. 4.

Figure 5:
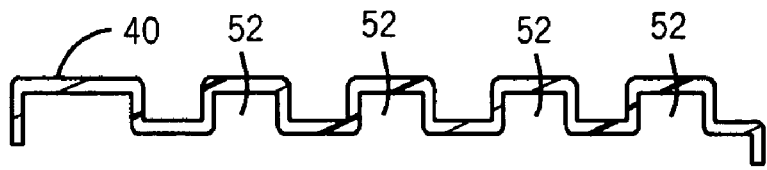
FIG. 5 is a sectional view through the support element of FIG. 4 taken along line 5-5.
Figure 6:
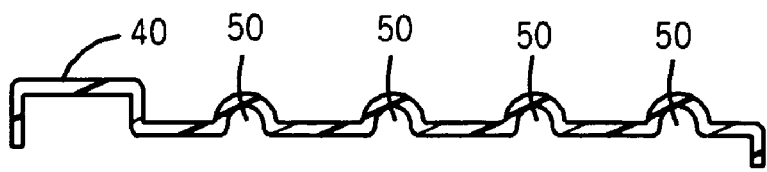
FIG. 6 is a sectional view of the support element of FIG. 4 taken along line 6-6.

FIG. 5 is a sectional view through the main bus support 40 along line 5-5, whereas FIG. 6 is a similar sectional view along line 6-6. As shown in FIG. 5, the bus support provides an electrical isolation barrier between the front side and rear sides thereof. The pockets 52 are sufficiently deep to accommodate the stabs of the component supports. The elongated bus bar recesses 50 effectively maintain alignment of the bus bars, and serve as a rear support for the bus bars, generally aligning with the pockets 52. In a present embodiment, 12 rows of such pockets are provided along the height of the main support 40.

Figure 7:
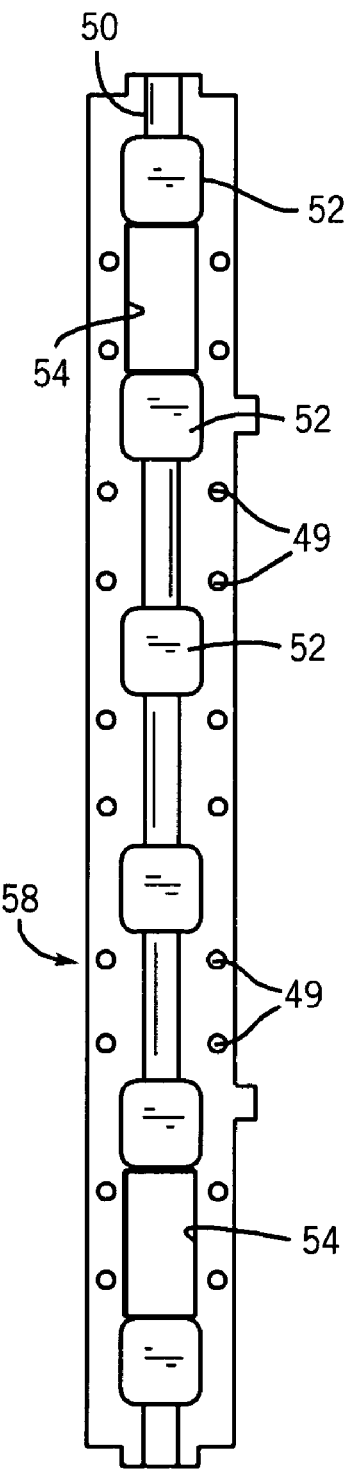
FIG. 7 is an elevational view of an add-on support element for use with the main support element of FIG. 4.

FIG. 7 is an elevational view of an exemplary insert 58 for accommodating neutral vertical bus bars with the main support 40. The insert 58 is configured as an add-on bus support element that can be mechanically attached to the main bus support 40, such as by tabs received within slots of the main bus support. However, any suitable attachment arrangement may be envisaged for the insert 58. Mounting bolt holes 49 are also provided in the insert 58 for securing the insert to the horizontal bus and mechanical support during assembly of the system. Similarly, elongated bus bar recesses 50 are provided, as are pockets 52 generally identical to those of the main support described above. The elongated recesses and pockets of the insert generally align with those along the right side of the main support when the insert is installed in the main support, so as to facilitate supporting of the neutral bus bar. Finally, apertures 54 provided in the insert for receiving flat portions of the neutral bus bar used to mechanically and electrically couple the neutral bus bar to the horizontal neutral bus supported on the rear surface of the main support. It should be noted that in the embodiment illustrated two such apertures are provided, one aperture serving to electrically couple the neutral bus elements to one another, and the second to mechanically support the vertical neutral bus in position within the assembly, to withstand forces generated in the event of a fault condition (e.g., short circuit).

Figure 8:
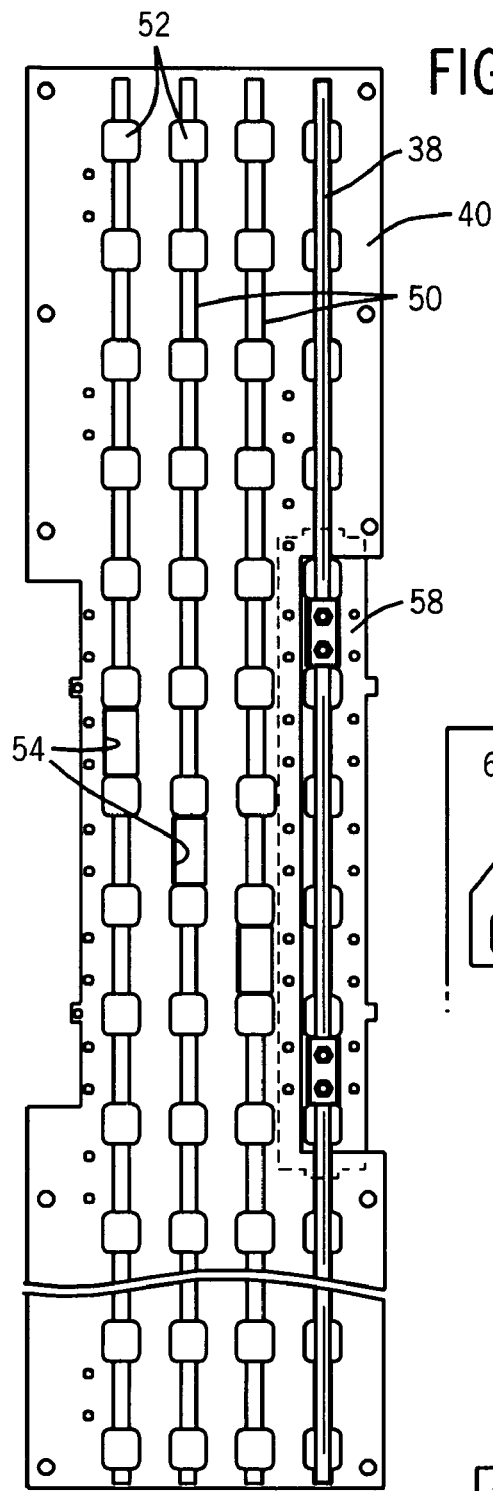
FIG. 8 is an elevational view of the main support element of FIG. 4 assembled with the add-on support element of FIG. 7 and a neutral bus bar supported by both elements.

FIG. 8 illustrates the main support 40 and insert 58 installed together in an assembly with a neutral vertical bus bar installed. As indicated above, the add-on bus support insert 58 fits within the recess 56 illustrated in FIG. 4, and is mechanically secured to the main bus support. The neutral vertical bus bar, then, lies within the elongated bus bar recesses of the main support and the insert, and the pockets of both support elements generally aligned to receive stabs of component supports. Thus, the same main support may be used for both three-wire and four-wire three-phase systems. To convert the arrangement of FIG. 4 into the four-wire three-phase arrangement of FIG. 8, the user simply adds the insert of FIG. 7, along with a vertical bus bar. It should also be noted that the insert may be, and is in a present embodiment also attached to the horizontal bus.

Figure 9:
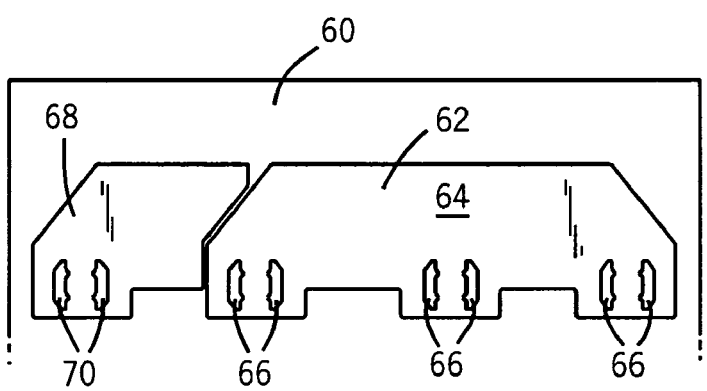
FIG. 9 is a rear view of a component support configured to be plugged into or otherwise interfaced with the assembly of FIG. 2.

The foregoing arrangement may be used with conventional component supports, such as those typically found in MCCs and other systems. However, to further reduce the number of separate parts and the associated costs, connection or stab housings for the component supports may also be designed in a modular fashion. FIG. 9 generally represents such stab housings as may be used with the universal bus support system described above. As shown in FIG. 9, a rear surface of a component support 60 may include a phase stab housing 62 designed for electrical connection to various components within the enclosure, and presenting on a rear surface 64 thereof a series of stabs 66. The stab housing itself is an insulated enclosure from which the stabs extend. Each of the stabs presents a pair of prongs, one stab being provided for each phase of electrical power. The prongs are received through the slots in the bus cover described above (see, e.g., FIG. 2). An add-on stab housing 68 may be then added to the assembly for use in four-wire three-phase systems. That is, the add-on stab housing 68 is designed only for interfacing with the neutral vertical bus bar described above. The housing 68 is generally similar to stab housing 62, presenting a stab 70 that make electrical connection with the vertical neutral bus bar when the component support 60 is fully installed in the enclosure. Where the system is designed for three-wire three-phase operation, the add-on stab housing 68 may be eliminated from the component support, further reducing complexity and cost.

Figure 10:
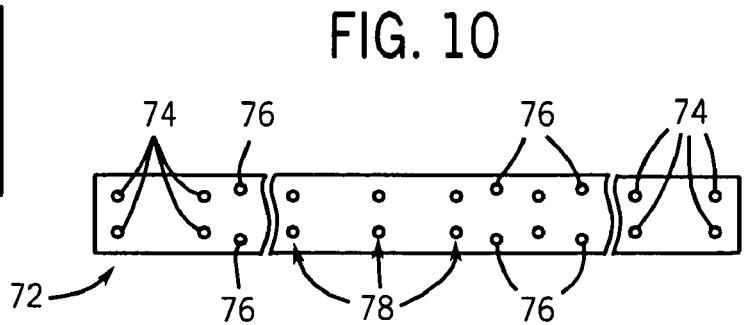
FIG. 10 is an elevational view of an exemplary horizontal bus bar of a type suitable for use with the bus support elements illustrated in the previous figures.

FIG. 10 illustrates an exemplary horizontal bus bar for use with the system described above. The bus bar is desired for use as either a phase conductor or a neutral conductor, and can be interfaced at any of the positions described above (see, e.g., FIG. 2. As illustrated, the universal bus bar 72 includes a series of holes 72 near each end for splicing bus bar sections to one another. Additional holes 76 are provided for mechanical connection of the bus bar to the main bus support described above. Finally, a series of holes 76 are provided at locations corresponding to the vertical buses and openings in the bus supports (see, e.g., FIGS. 2, 4 and 8) for joining the horizontal bus to any one of the vertical bus bars.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical bus system comprising:
   a main support element configured to support vertical three-phase buses on a first side thereof, wherein the main support element includes openings for electrically coupling the vertical buses to horizontal three-phase buses on a second side opposite the first side thereof; and
   an add-on support element configured to interface with the main support element to support a vertical neutral bus on the first side.

2. The electrical bus system of claim 1, wherein the add-on support element includes at least one opening for electrically coupling the neutral bus to a horizontal neutral bus on the second side thereof.

3. The electrical bus system of claim 1, wherein the add-on support element includes an opening for electrically coupling the neutral bus to a horizontal neutral bus, and a second opening for mechanically attaching the neutral bus to a support structure disposed on the second side of the main support element.

4. The electrical bus system of claim 1, wherein the main support element includes a recess in which the add-on support element is fitted for supporting the neutral bus.

5. The electrical bus system of claim 1, wherein the main support element is configured to be secured to a supporting enclosure, and the add-on support element is configured to be secured to the main support element.

6. The electrical bus system of claim 1, wherein the main support element and the add-on support element are made of a glass-filled thermoset polymeric material.

7. The electrical bus system of claim 1, wherein the main support element includes three elongated recesses for receiving the three-phase buses, and a fourth elongated recess for receiving the neutral bus.

8. The electrical bus system of claim 7, wherein the add-on support element includes an elongated recess that aligns with the fourth elongated recess for receiving the neutral bus.

9. The electrical bus system of claim 8, wherein the main support element and the add-on support element include pockets contiguous with the elongated recesses for receiving electrical stabs for coupling components to the buses.

10. An electrical bus system comprising:
    a main support element configured to be mounted in an electrical enclosure and including three elongated recesses for receiving vertical three-phase buses on a first side thereof, the main support element further having a fourth elongated recess for receiving a vertical neutral bus; and
    an add-on support element configured for attachment to the main support element and including an elongated recess aligned with the fourth elongated recess of the main support element for receiving the vertical neutral bus.

11. The electrical bus system of claim 10, wherein the main support element has openings for electrically coupling the vertical buses to horizontal three-phase buses on a second side opposite the first side thereof.

12. The electrical bus system of claim 10, wherein the add-on support element includes at least one opening for electrically coupling the neutral bus to a horizontal neutral bus on a second side opposite the first side thereof.

13. The electrical bus system of claim 12, wherein the add-on support element includes an opening for electrically coupling the neutral bus to the horizontal neutral bus, and a second opening for mechanically attaching the neutral bus to a support structure disposed on the second side of the main support element.

14. The electrical bus system of claim 10, wherein the main support element includes a side recess in which the add-on support element is fitted for supporting the neutral bus.

15. An electrical bus system comprising:
    a main support element configured to be mounted in an electrical enclosure, wherein the main support element includes a plurality of openings;
    an add-on support element attached to the main support element;
    three-phase buses secured to a first side of the main support, wherein the three-phase buses are configured to be coupled to horizontal buses disposed on a second side opposite the first side of the main support element through the openings; and a neutral bus secured to the first side of the main support and to the add-on support element.

16. The electrical bus system of claim 15, wherein the add-on support element includes at least one opening, and the neutral bus is configured to be coupled to a horizontal neutral bus through the at least one opening.

17. The electrical bus system of claim 15, wherein main support element includes apertures for bolting the main support element in the electrical enclosure.

18. The electrical bus system of claim 15, further including a cover fitted to the main support element to cover the three-phase buses and the neutral bus, the cover including openings for electrical stabs for connecting electrical components to the buses.

19. An electrical bus system comprising:
a main support element configured to support vertical three-phase buses on a first side thereof; and
an add-on support element configured to interface with the main support element to support a vertical neutral bus on the first side, wherein the add-on support element includes at least one opening for electrically coupling the neutral bus to a horizontal neutral bus on a second side opposite the first side thereof.

* * * * *